Figure 1:
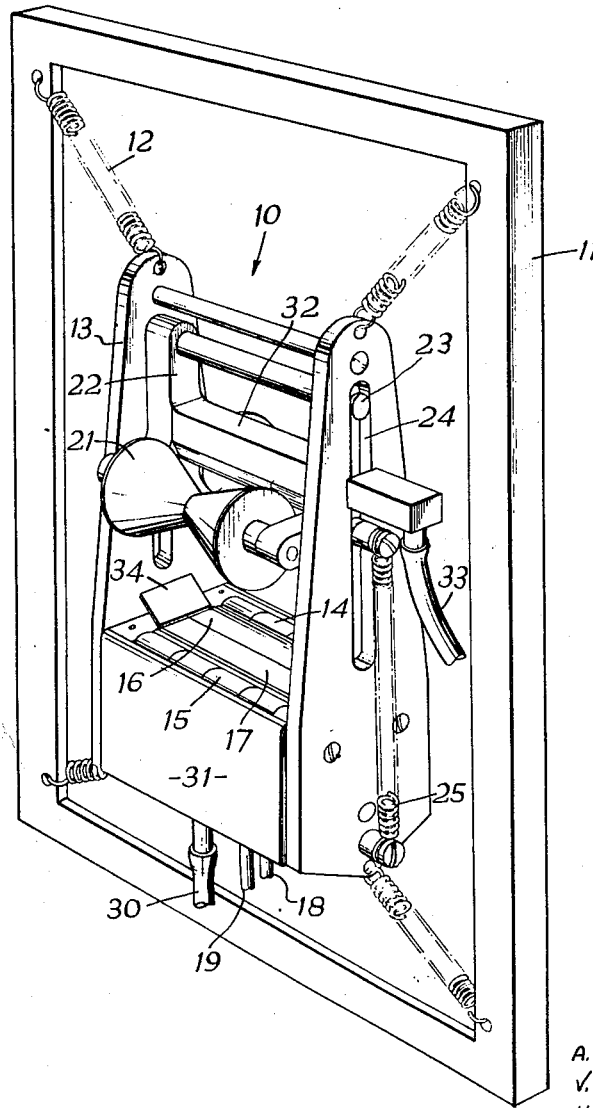

Feb. 18, 1964     A. B. C. RANKIN ETAL     3,121,325
ULTRASONIC TESTING OF MATERIALS

Filed July 18, 1960     3 Sheets-Sheet 1

A. B. C. RANKIN,
V. C. BUFFERY,
H. W. TAYLOR, &
E. F. FRENCH
INVENTORS

BY Moore & Hall
ATTORNEYS

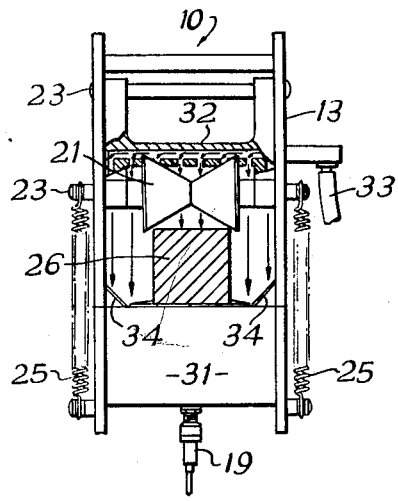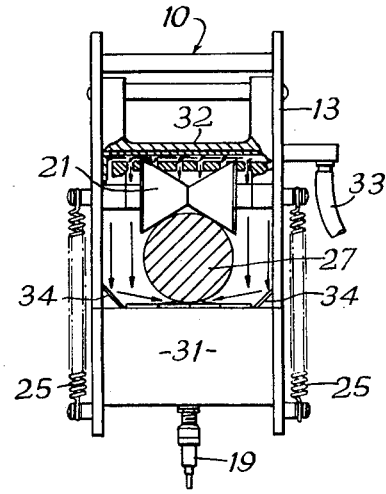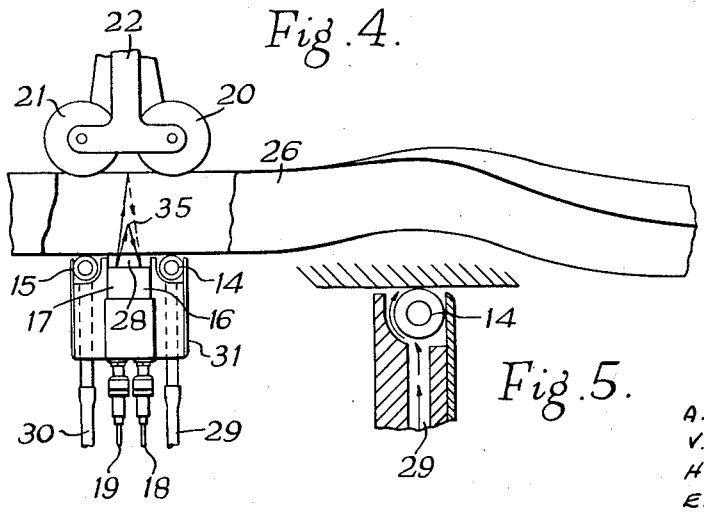

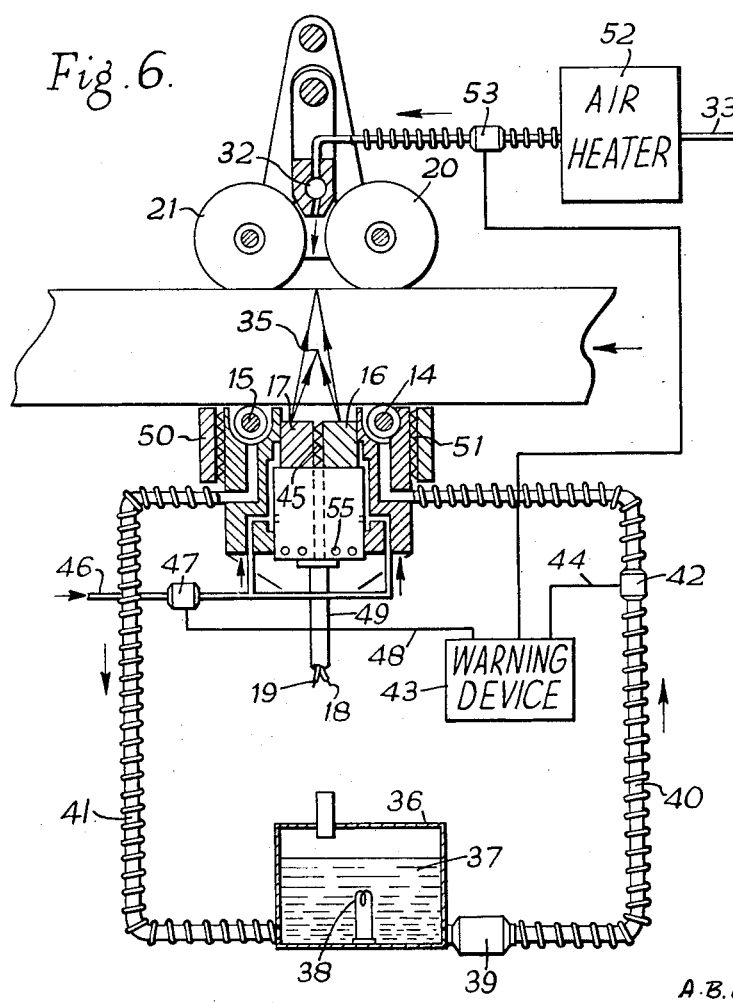

United States Patent Office 3,121,325
Patented Feb. 18, 1964

3,121,325
ULTRASONIC TESTING OF MATERIALS
Alexander Bryce Calder Rankin, Victor Charles Buffery, Harold William Taylor, and Ernest Frederick French, all % Hunsun Works, New North Road, Barkingside, England
Filed July 18, 1960, Ser. No. 43,424
Claims priority, application Great Britain July 20, 1959
15 Claims. (Cl. 73—67.7)

The present invention relates to the ultrasonic testing of materials in elongated form, such as bars or tubes of circular or other cross-section.

It is often required to carry out continuous scanning with an ultrasonic beam of long lengths of material at a relatively high speed. The transmitting and receiving probe or probe system is moved relatively to the surface of the material and in what is known as "contact scanning" is in oily contact with the surface. In "gap scanning" the probe is close to but separated by a film of coupling liquid (e.g. a film of water 0.005 inch thick) from the surface of the material and in "immersion scanning" the probe is widely spaced from the surface, the probe and material being immersed in a water bath, whereby the mass of water provides acoustic coupling. The most convenient and reliable of these techniques is gap scanning and it is with this form of testing that the present invention is concerned.

According to the present invention there is provided apparatus for the ultrasonic testing of elongated material by gap scanning comprising two assemblies, between which the material is to be passed, arranged to be urged resiliently towards one another whereby these assemblies exert resilient pressure upon the material, one of the assemblies comprising an ultrasonic transmitting and receiving probe or probe system and means for maintaining the wave-transmitting and wave-receiving surface or surfaces of the probe or probe system at a fixed small distance from the adjacent surface of the material, and the other assembly comprising a roller having a concave shape in axial section mounted for rotation about an axis approximately perpendicular to the length of the material, this roller being, therefore, adapted to locate the material in a direction perpendicular to its length.

Preferably, the said other assembly comprises two of the said rollers arranged with their axes parallel to one another. The said means for maintaining the fixed small distance between the material and the probe surface or surfaces may comprise further rollers mounted upon opposite sides of the probe surface or surfaces for rotation about axes perpendicular to the length of the material.

Means may be provided for maintaining a continuous flow of coupling liquid to the space or gap between the material and the probe surface or surfaces.

According to an important subsidiary feature of the invention, means are provided for directing streams of air upon the said gap on both sides of the material in such a manner as to tend to remove coupling liquid from the parts of the probe surface or surfaces other than that through which the ultrasonic waves are required to pass into the material under test.

The invention will be described, by way of example, with reference to the accompanying drawings in which FIG. 1 is a perspective view of one embodiment of the invention, FIGS. 2 and 3 are views in front elevation partly in section of part of the embodiment of FIG. 1 illustrating the use of the apparatus with material of square and circular cross-section respectively, the material being shown in section, FIG. 4 is a somewhat diagrammatic view in side elevation of part of the apparatus of FIGS. 1 to 3 showing the relative positions of parts and the use of the apparatus with material that is not straight, FIG. 5 is a view in sectional side elevation of a part of the apparatus, and FIG. 6 shows diagrammatically in section a modification of the apparatus of FIGS. 1 to 5.

Referring to FIGS. 1 to 5, a scanning unit 10 is mounted in a fixed outer frame 11 by means of four light springs 12. The unit 10 comprises an inner frame 13 having fixedly mounted thereon spindles rotatably supporting two sets of rollers 14 and 15 and a probe assembly comprising a transmitting probe 16 and a receiving probe 17. The probes are of known construction comprising two blocks of "Perspex" each having a transducer (not shown) at its lower end. Connections to the transducers are made by cables 18, 19. The parts 14, 15, 16 and 17 constitute one of the two assemblies hereinbefore referred to.

The other assembly comprises two rollers 20, 21 mounted for rotation about parallel axes upon a support 22 which is slidable in the inner frame 13. Each roller 20, 21 is of concave shape in axial section: in this example the shape is that of two conical frusta joined at their smaller diameter ends. The support 22 has projecting pins 23 slidable in slots 24 in the frame 13, stiff springs 25 serving to urge the rollers 20, 21 toward the rollers 14, 15. The way in which material 26 or 27 of square or circular cross-section is gripped is shown in FIGS. 2 and 3 respectively. In either case the effect of the rollers 20, 21 is to locate the material in a direction perpendicular to its length.

The gap 28 between the probes 16, 17 and the material 26 is shown exaggerated in size in FIG. 4; in practice it will be of only a few thousandths of an inch thick. Its thickness is maintained by the rollers 14, 15. Water is fed to the gap continuously through inlet pipes 29, 30 as shown in FIGS. 4 and 5. Surplus water is collected in a tank 31 from which it can be removed in any convenient manner, for example through an overflow pipe (not shown) which prevents the level exceeding a predetermined value.

The water may be fed to the pipes 29, 30 from a constant-head tank which is itself kept full from a main water supply. In this way the water pressure can be regulated to fine limits and turbulence and aeration can thus be kept to a minimum. A regulated supply of a wetting agent may be fed to the constant-head tank.

In use, the main weight of the material 26 or 27 being tested is taken by roller tables (not shown) on either side of the scanning unit 10. When the material is not straight, as shown in FIG. 4, the unit 10 is able to move by virtue of its spring mounting on the frame 11 so as to maintain the correct positioning of the probe surfaces relatively to that of the material as the material is fed through the unit. The paths of ultrasonic waves through the material, which is assumed to have a flaw at 35, are indicated in FIG. 4 and the display of the received echoes may be effected in well-known manner.

It is found to be highly desirable to maintain the top surfaces of the probes 16, 17 free from water excepting in that region immediately beneath the material to be tested and, in the case of a material of circular cross-section, excepting in the region closest to the surface of the material. If this is not done the signal-to-noise ratio is unduly low owing to acoustic transmissions through the water on either side of the region through which the scanning waves pass into the material.

This result is achieved, in the embodiment illustrated, by means of air jets from a manifold 32 fed with compressed air through a pipe 33. The paths of the air are indicated by arrows in FIGS. 2 and 3. In the case of a material 26 of square section, as shown in FIG. 2, it is sufficient that the air should be directed vertically downward. In the case of a circular cross-section 27, however, in order to remove water from the area of the probe surface in the shadow of the maximum diameter of the material it is desirable to direct air with a horizontal as well as a vertical component. This may be achieved by the provision of deflectors 34.

Means may be provided for automatically giving a warning if the air pressure from the jets becomes too low or too high. The former fault will result in spurious signals, arising from acoustic transmission through the water outside the gap, which may pass through the gating circuits provided to select echoes from flaws. The latter fault may cause a loss of coupling owing to water being blown out of the gap.

One way in which this can be done will be described with reference to FIG. 6 which also shows how the apparatus described can be used, with only minor modifications, for testing materials at high temperature. One of the most important features of the apparatus permitting such operation is that the coupling liquid can readily be maintained in a closed loop system.

Thus referring to FIG. 6, a closed loop system includes a reservoir 36 for coupling liquid 37 which may be maintained at a desired temperature by heating means indicated diagrammatically at 38. Liquid from the reservoir is circulated by a pump 39 through a pipe 40 to one side of the probe assembly 14, 15, 16, 17, and liquid from the other side of the probe assembly is returned by a pipe 41 to the reservoir 36. The pipe 40 contains a two-level, pressure-sensitive device 42 which can be pre-set to an upper and a lower limit of pressure. When either of these limits is passed an electrical circuit is closed and a warning is given by a device 43 to which the device 42 is connected by a wire 44.

The rollers 14, 15 and other parts are made of suitable heat-resisting materials. Thus the probes 16, 17 may be made of highly compressed fine-grained carbon such as is used for electric potentiometers. Such material has a velocity of transmission of ultrasonic waves which is about one third of that in steel. A curtain 45 of corrugated sheet asbestos may be provided between the probes 16 and 17. The piezo-electric transducers may be water- or air-cooled and, if desired, may be of a high temperature type for instance comprising lead zirconate. Thus in the example of FIG. 6 cold air is fed through a pipe 46 to a jacket surrounding the probes and escapes through vents 55. A further pressure-sensitive switch 47 of the same design as the switch 42 may be provided in the pipe 46 and when the upper or lower limits of pressure are passed a warning is given by the device 43 to which the device 47 is coupled by a wire 48. The choice of coupling liquid 37 depends upon the operating temperature required. The liquid may, for example, be a mixture of fused salts such as are used for heat treatment, or may be molten metal.

A furnace for melting the coupling substance may be arranged below the probes in such a manner that excess coupling liquid drains straight back into the furnace and molten coupling liquid is pumped from the furnace into the pipes 29, 30 of FIGS. 1–4. The electrical connections 18, 19 may be led through the centre of a double-walled pipe 49 (FIG. 6), water being circulated by means not shown through the annular space between the walls. A jacket 50 with a heater 51 may be provided around the probe assembly as shown in FIG. 6.

FIG. 6 also shows means 52 for heating air supplied to the manifold 32 through pipe 33. The heated air passes through a further pressure-sensitive switch 53, similar to 42 and 47, which is connected to the warning device 43 by a wire 54.

A single transmitting/receiving probe and transducer can, of course, be used in carrying out the invention instead of the two separate probes and transducers.

While there have been described above what are presently believed to be the preferred forms of the invention, variations thereof will be obvious to those skilled in the art, and all such changes and variations which fall within the spirit of the invention are intended to be covered by the generic terms in the appended claims, which are variably worded to that end.

We claim:

1. Apparatus for the ultrasonic testing of elongated material by gap scanning comprising two assemblies, between which the material is to be passed, resilient means urging said assemblies towards one another whereby these assemblies exert resilient pressure upon the material, one of said assemblies comprising ultrasonic wave transmitting and receiving means having at least one surface traversed by waves transmitted into and received from said material, and means for maintaining said surface at a fixed small gap distance from said material, and the other said assembly comprising a roller having a concave shape in axial section, and means supporting said roller for rotation about an axis approximately perpendicular to the length of said material.

2. Apparatus according to claim 1, wherein the said other assembly comprises two of the said rollers arranged with their axes parallel to one another.

3. Apparatus according to claim 1, wherein said roller has the shape, in axial section, of two conical frusta joined at their smaller diameter ends.

4. Apparatus according to claim 1, wherein the said means for maintaining the fixed small distance between the material and the probe surface or surfaces comprise further rollers mounted upon opposite sides of the probe surface or surfaces for rotation about axes perpendicular to the length of the material.

5. Apparatus according to claim 1 comprising means for maintaining a continuous flow of coupling liquid to said gap between the material and the probe surface or surfaces.

6. Apparatus according to claim 5 comprising a reservoir for coupling liquid, a loop system coupling said gap to said reservoir and means for circulating said liquid around said loop system.

7. Apparatus according to claim 6 comprising means for heating said coupling liquid.

8. Apparatus according to claim 6 comprising means for indicating when the pressure of the coupling liquid exceeds and falls below predetermined upper and lower limits respectively.

9. Apparatus according to claim 1 comprising means for directing streams of air upon the said gap on both sides of the material in such a manner as to tend to remove coupling liquid from the parts of the probe surface other than that through which the ultrasonic waves are required to pass into the material under test.

10. Apparatus according to claim 9, wherein the air streams are in a direction approximately perpendicular to the probe surface or surfaces and wherein means are provided for deflecting the air streams inwardly towards the gap.

11. Apparatus according to claim 9, comprising means for indicating when the pressure of the air exceeds and falls below predetermined upper and lower limits respectively.

12. Apparatus according to claim 9 comprising means for heating the air.

13. Apparatus for the ultrasonic testing of elongated material comprising ultrasonic wave injecting and receiving probe means for injecting ultrasonic waves into and receiving ultrasonic waves from said material, said waves entering and leaving said probe means through a probe surface, means for maintaining a fixed gap between said probe means and said material, means for supplying a coupling liquid to said gap, and means for directing streams of air upon at least two opposed external edges of the said gap in such a manner as to exert pressure upon the coupling liquid in said gap and to tend to remove coupling liquid from the parts of said probe surface other than that through which the ultrasonic waves are required to pass into the material under test, wherein the air streams are in a direction approximately perpendicular to said probe surface and wherein means are provided for deflecting the air steams inwardly towards the gap.

14. Apparatus for the ultrasonic testing of elongated material comprising ultrasonic wave injecting and receiving probe means for injecting ultrasonic waves into and receiving ultrasonic waves from said material, said waves entering and leaving said probe means through a probe surface, means for maintaining a fixed gap between said probe means and said material, means for supplying a coupling liquid to said gap, and means for directing streams of air upon at least two opposed external edges of the said gap in such a manner as to exert pressure upon the coupling liquid in said gap and to tend to remove coupling liquid from the parts of said probe surface other than that through which the ultrasonic waves are required to pass into the material under test, and means for indicating when the pressure of the air exceeds and falls below predetermined upper and lower limits respectively.

15. Apparatus for the ultrasonic testing of elongated material comprising ultrasonic wave injecting and receiving probe means for injecting ultrasonic waves into and receiving ultrasonic waves from said material, said waves entering and leaving said probe means through a probe surface, means for maintaining a fixed gap between said probe means and said material, means for supplying a coupling liquid to said gap, and means for directing streams of air upon at least two opposed external edges of the said gap in such a manner as to exert pressure upon the coupling liquid in said gap and to tend to remove coupling liquid from the parts of said probe surface other than that through which the ultrasonic waves are required to pass into the material under test, and means for heating the air.

References Cited in the file of this patent

UNITED STATES PATENTS

| | | |
|---|---|---|
| 2,873,391 | Schulze | Feb. 10, 1959 |
| 2,908,161 | Bincer | Oct. 13, 1959 |
| 2,940,305 | Williams et al. | June 14, 1960 |
| 2,951,365 | Legrand | Sept. 6, 1960 |